(12) United States Patent
Trost et al.

(10) Patent No.: US 10,306,018 B2
(45) Date of Patent: *May 28, 2019

(54) CONNECTION MANAGEMENT SERVICE

(71) Applicant: AT&T Intellectual Property I, L.P., Atlanta, GA (US)

(72) Inventors: William Trost, Mequon, WI (US); Craig Harvey, Apex, NC (US); Harvey Cary, Holly Springs, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,294

(22) Filed: Oct. 16, 2017

(65) Prior Publication Data

US 2018/0041609 A1 Feb. 8, 2018

Related U.S. Application Data

(63) Continuation of application No. 14/680,303, filed on Apr. 7, 2015, now Pat. No. 9,794,372.

(51) Int. Cl.
*G06F 15/16* (2006.01)
*H04L 29/08* (2006.01)
*H04L 29/06* (2006.01)

(52) U.S. Cl.
CPC ........... *H04L 67/327* (2013.01); *H04L 63/08* (2013.01); *H04L 67/02* (2013.01); *H04L 67/10* (2013.01); *H04L 67/1097* (2013.01)

(58) Field of Classification Search
CPC ....... H04L 67/327; H04L 63/08; H04L 67/02; H04L 67/10; H04L 67/1097
See application file for complete search history.

(56) References Cited

U.S. PATENT DOCUMENTS

| 7,752,256 | B2 | 7/2010 | Bloch |
| 7,984,290 | B2* | 7/2011 | Hashimoto ........... H04L 63/029 713/155 |
| 8,069,242 | B2 | 11/2011 | Hadar et al. |
| 8,463,922 | B2 | 6/2013 | June |
| 8,514,868 | B2 | 8/2013 | Hill |
| 9,239,744 | B2 | 1/2016 | Boskovic |

(Continued)

OTHER PUBLICATIONS

Mastelic et al., "Towards Uniform Management of Cloud Services by Applying Model-Driven Development," Computer Software and Applications Conference (COMPSAC), 2014 IEEE 38$^{th}$ Annual, Jul. 21-25, 2014.

(Continued)

*Primary Examiner* — Moustafa M Meky
(74) *Attorney, Agent, or Firm* — Hartman & Citrin LLC

(57) ABSTRACT

Concepts and technologies are disclosed herein for providing and using a connection management service. A connection management service can receive a connection request that requests a connection between a requestor and a distributed network. The connection management service can identify a connector to provide the connection between the requestor and the distributed network. The connection management service can provide, to the requestor, an object corresponding to the connector. The requestor can invoke the object to connect to the distributed network.

20 Claims, 5 Drawing Sheets

(56) References Cited

U.S. PATENT DOCUMENTS

| | | |
|---|---|---|
| 9,280,400 B2 | 3/2016 | Boskovic |
| 9,794,372 B2 * | 10/2017 | Trost .................... H04L 67/327 |
| 2003/0195923 A1 | 10/2003 | Bloch |
| 2005/0135336 A1 | 6/2005 | Kato |
| 2006/0277406 A1 * | 12/2006 | Hashimoto ........... H04L 63/029 |
| | | 713/168 |
| 2008/0104080 A1 | 5/2008 | Copeland |
| 2008/0312962 A1 * | 12/2008 | Kirkwood ............ G06Q 20/387 |
| | | 705/2 |
| 2012/0250669 A1 | 10/2012 | Lu et al. |
| 2013/0124401 A1 | 5/2013 | Del Real |
| 2013/0159379 A1 | 6/2013 | Boskovic |
| 2014/0006581 A1 | 1/2014 | Raghu |
| 2014/0156786 A1 | 6/2014 | Boskovic |
| 2014/0201379 A1 | 7/2014 | Barzily et al. |
| 2015/0006726 A1 | 1/2015 | Yuan et al. |
| 2017/0300042 A1 * | 10/2017 | Pauly ................. G05B 19/4186 |

OTHER PUBLICATIONS

U.S. Office Action dated Feb. 6, 2017 in U.S. Appl. No. 14/680,303.
U.S. Notice of Allowance dated Jun. 5, 2017 in U.S. Appl. No. 14/680,303.

* cited by examiner

CONNECTION MANAGEMENT SERVICE

CROSS-REFERENCE TO RELATED APPLICATIONS

This application is a continuation of and claims priority to U.S. patent application Ser. No. 14/680,303, entitled "Connection Management Service," filed Apr. 7, 2015, now U.S. Pat. No. 9,794,372, which is incorporated herein by reference in its entirety.

BACKGROUND

The phrase "cloud computing" is sometimes used to refer to the notion of using shared hardware resources to support or host multiple software instances. For example, a single hardware resource may host a number of virtual machines, thereby providing flexibility and redundancy for the hosted machines with only a single hardware device. Thus, for example, a single server computer may host multiple applications or perform a variety of functions, while in the past such applications or functions may have been hosted or provided by a single dedicated hardware instance such as a server, or the like.

When a developer, network operator, or other entity determines that a particular application, service, or function is to be moved to "the cloud," the entity may identify hardware that is to host the application, service, or function, and then craft executable code to perform the desired functions. The various "cloud computing" environments in existence today may support (or not support) any number of protocols or services. As such, the interfaces between these applications, services, and/or functions and the hardware that hosts these applications, services, or functions may be crafted by a skilled programmer or other entity to enable communication between the applications, services, or functions and the hardware environment that hosts them.

Because of a variety that exists among the types of hardware and/or software that may be used to host such "cloud-based" environments, the interfaces between the applications, services, and/or functions and the hardware may differ among multiple hardware instances. This can complicate the task of moving such an application, service, or function to the "cloud." As a result, moving applications, services, or functions to the "cloud" can be expensive and time consuming.

SUMMARY

The present disclosure is directed to providing and using a connection management service that can simplify and standardize connections between applications, services, and/or functions and resources operating on or as part of a distributed networking environment ("distributed network"). According to one embodiment of the concepts and technologies described herein, an application server can operate in communication with a server computer that can host a connection management service. The application server can host an application, service, function, or other resource that is to connect to a distributed network. The application server (or other requestor) can interact with the connection management service to request a connection to the distributed network, to receive a connector that encompasses and/or enables the connection, and invoke and communicate using the connector provided by the connection management service. According to various embodiments of the concepts and technologies described herein, the functionality of the connector can be provided by an object that is invoked to provide the functionality illustrated and described herein.

The requestor can request the connection by generating a connection request ("request") and transmitting the request to the connection management service. The request can include a "subject" field or other data structure that can identify the requestor and a "request information" field or other data structure that can set forth various aspects of the requested connection such as protocols to be supported by the connection, security or other services to be layered on and/or to operate within the connection, types of information to be transferred via the connection, combinations thereof, or the like. Thus, the request can include the information needed by the connection management service to identify, instantiate, configure, and provide the connector to the requestor.

In some embodiments, for example, the connection management service can analyze the request to identify the requestor (e.g., based upon the subject field) and the type of connection requested (e.g., based upon the request information field). In some embodiments, the connection management service can authenticate the requestor. The requestor can be authenticated in various manners. In some embodiments, the requestor can provide a security token, digital certificate, username/password pair, or other information as credentials that can be used to authenticate the requestor. These credentials can be provided on demand, with the request, and/or as a part of the request (e.g., as information included in the subject field). The connection management service can perform authentication on its own or pass the credentials to an authentication service. The connection management service can make or receive a decision indicating whether authentication was successful or not. Upon authenticating the requestor or determining that authentication is not needed, the connection management service can identify a connector to support the requested connection.

In some cases, the connector identified by the connection management service may or may not be active. In particular, the concepts and technologies described herein support persistent connectors and/or connectors that are terminated or deactivated after use. Thus, the connection management service can identify a connector or a representation of the connector and determine if the identified connector is active or if the identified connector is not active. If the connector is not active, the connection management service can instantiate and configure the connector. The connector can be configured in accordance with one or more parameters that may be provided by the requestor or determined by the connection management service. The instantiated and configured connector can be provided to the requestor by the connection management service. The requestor can invoke the connector to connect to the distributed network or a resource thereon. Thus, a reusable, consistent, and controllable connection mechanism can be provided to support communications between multiple requestors and a resource on a distributed network in a consistent and predictable manner.

According to one aspect of the concepts and technologies disclosed herein, a method is disclosed. The method can include receiving, at a processor executing a connection management service, a connection request. The connection request can request a connection between a requestor that generated the connection request and a resource that operates on a distributed network. The method also can include identifying, by the processor, a connector that provides the connection between the requestor and the distributed network. The method also can include providing, by the processor and to the requestor, an object corresponding to the connector. The requestor can invoke the object to connect to the distributed network.

According to one aspect of the concepts and technologies disclosed herein, a method is disclosed. The method can include receiving, at a processor executing a connection management service, a connection request. The connection request can request a connection between a requestor that generated the connection request and a resource that operates on a distributed network. The method also can include identifying, by the processor, a connector that provides the connection between the requestor and the distributed network. The method also can include providing, by the processor and to the requestor, an object corresponding to the connector. The requestor can invoke the object to connect to the distributed network.

In some embodiments, the requestor can include an application server. In some embodiments, the connection request can include a subject field and a request information field. In some embodiments, the subject field can identify the application server, and the request information field can identify a service that is supported by the connection. In some embodiments, the method also can include determining, by the processor, that the connector is not active, instantiating, by the processor, the connector, and configuring, by the processor, the connector.

In some embodiments, configuring the connector can include identifying a connection parameter associated with the connector and configuring the connector based upon the connection parameter. In some embodiments, the connection parameter can identify a protocol supported by the connector. In some embodiments, the connection parameter can identify a service supported by the connector. In some embodiments, identifying the connector can include searching a connector repository to identify the connector based upon a service that is to be supported by the connection.

According to another aspect of the concepts and technologies disclosed herein, a system is disclosed. The system can include a processor and a memory. The memory can store computer-executable instructions that, when executed by the processor, cause the processor to perform operations. The operations can include receiving a connection request that requests a connection between a requestor and a resource that operates on a distributed network, identifying a connector that provides the connection between the requestor and the distributed network, and providing, to the requestor, an object corresponding to the connector. The requestor can invoke the object to connect to the distributed network.

In some embodiments, the operations can further include determining that authentication is required to identify and provide the connector, receiving credentials from the requestor, providing the credentials to an authentication service, and receiving a decision from the authentication service. In some embodiments, the operations can further include determining that authentication is required to identify and provide the connector, and extracting credentials from the connection request. The credentials can be provided by data included in a subject field of the connection request. The operations can also include providing the credentials to an authentication service and receiving a decision from the authentication service.

In some embodiments, the operations can further include determining that the connector is not active, instantiating the connector and configuring the connector. Configuring the connector can include identifying a connection parameter associated with the connector and configuring the connector based upon the connection parameter. In some embodiments, the requestor can include an application server. In some embodiments, the connection request can include a subject field and a request information field, the subject field can identify the application server, and the request information field can identify a service that is supported by the connection.

According to yet another aspect, a computer storage medium is disclosed. The computer storage medium can have computer-executable instructions stored thereon that, when executed by a processor, cause the processor to perform operations. The operations can include receiving a connection request that requests a connection between an application server and a resource that operates on a distributed network, identifying a connector that provides the connection between the application server and the distributed network, and providing, to the application server, an object corresponding to the connector. In some embodiments, the application server can invoke the object to connect to the distributed network.

In some embodiments, the operations can further include determining that authentication is required to identify and provide the connector, receiving credentials from the application server, providing the credentials to an authentication service, and receiving a decision from the authentication service. In some embodiments, the operations can further include determining that authentication is required to identify and provide the connector, and extracting credentials from the connection request. In some embodiments, the credentials can be provided by data included in a subject field of the connection request. The operations also can include providing the credentials to an authentication service, and receiving a decision from the authentication service. In some embodiments, the operations can further include determining that the connector is not active, instantiating the connector, and configuring the connector. In some embodiments, configuring the connector can include identifying a connection parameter associated with the connector and configuring the connector based upon the connection parameter.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
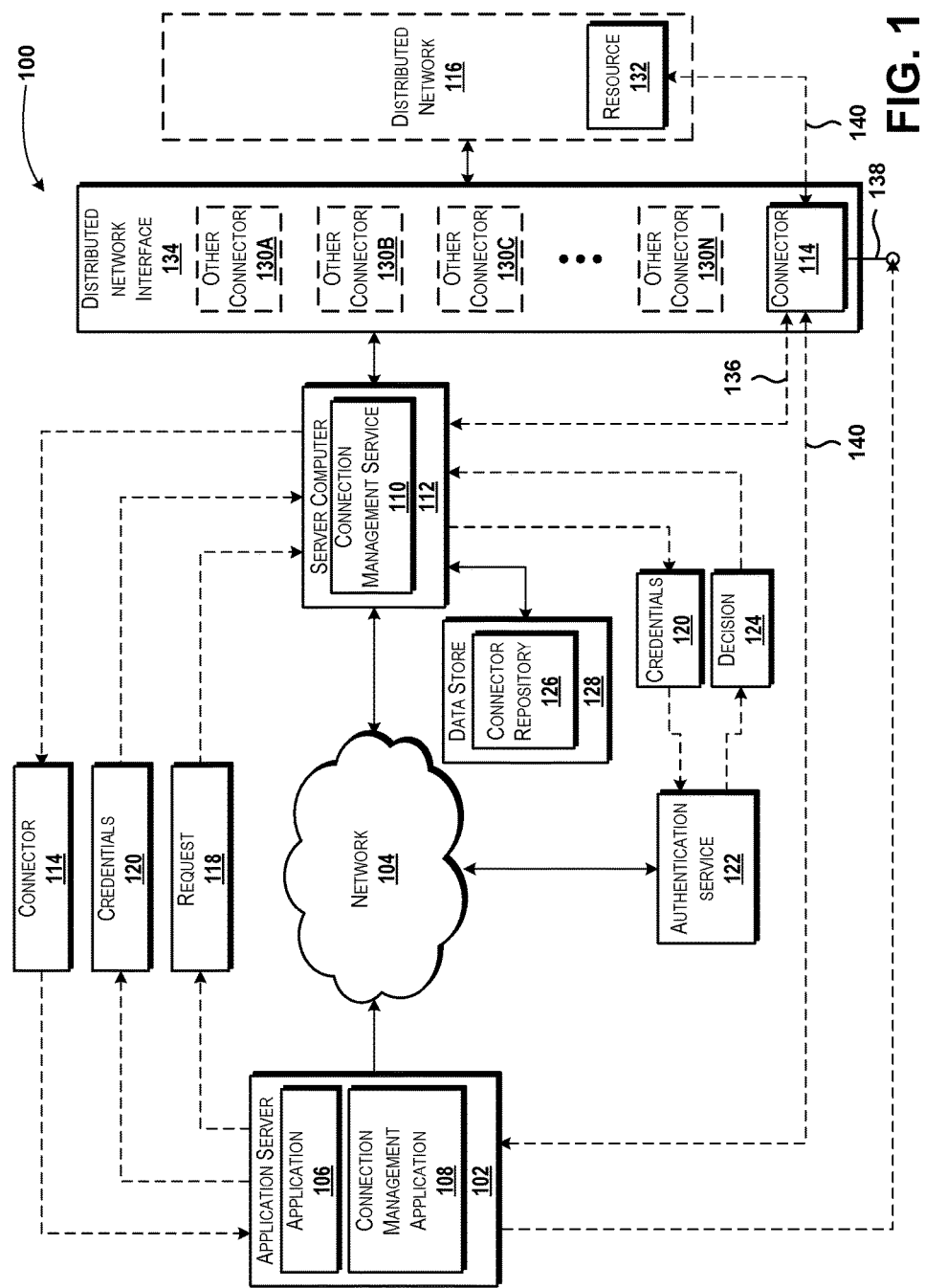
FIG. 1 is a system diagram illustrating an illustrative operating environment for various embodiments of the concepts and technologies described herein.

The following detailed description is directed to providing and using a connection management service. An application server can operate in communication with a server computer that can host a connection management service. The application server can host an application, service, or function, and a connection management application that can interact with a connection management service. The connection management service can be hosted by a server computer or other device. The application server or other request can interface with the connection management service to request a connection to a distributed networking environment such as an intranet, a cloud computing architecture, or the like ("distributed network").

The requestor can request the connection by generating a connection request (also referred to herein as a "request") and transmitting the request to the connection management service. In some embodiments of the concepts and technologies described herein, the request can include a "subject" field or other data structure that can identify the requestor and a "request information" field or other data structure that can set forth various aspects of the requested connection that is requested. The "request information" field can indicate, for example, protocols to be supported, security or other services to be layered on the connection, types of information to be transferred via the connection, combinations thereof, or the like.

The connection management service can receive the request and analyze the request to identify the requestor and the type of connection requested. In some embodiments, the connection management service can authenticate the requestor before identifying and/or providing a connector that provides the connection requested. The requestor can be authenticated in various manners. In some embodiments, the requestor can provide a security token, digital certificate, username/password pair, or other information as credentials that can be used to authenticate the requestor. The connection management service can perform authentication on its own or pass the credentials to an authentication service and receive a decision indicating whether authentication was successful or not. Upon authenticating the requestor or determining that authentication is not to be performed for the requestor, the connection management service can identify a connector to support the requested connection. The connector can be provided by an object that can encapsulate and manage the connection to provide a consistent, predictable, and controllable connection point between any requestor and a particular resource operating on or as a part of the distributed network.

Upon identifying the connector (or a model or representation of the connector), the connection management service can determine if the identified connector is active or if the connector is not active. If the connector is not active, the connection management service can instantiate and configure the connector. The connector can be configured in accordance with a number of parameters that may be provided by the requestor or determined by the connection management service. The instantiated and configured connector can be provided to the requestor by the connection management service. The requestor can invoke the connector to connect to the distributed network or a resource thereon.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for connection management service will be described, according to an illustrative embodiment. The operating environment 100 shown in FIG. 1 includes an application server 102 operating in communication with and/or as part of a communications network ("network") 104.

According to various embodiments, the functionality of the application server 102 may be provided by one or more server computers, desktop computers, mobile telephones, laptop computers, set-top boxes, other computing systems, and the like. It should be understood that the functionality of the application server 102 can be provided by a single device, by two similar devices, and/or by two or more dissimilar devices. For purposes of describing the concepts and technologies disclosed herein, the application server 102 is described herein as a server computer. It should be understood that this embodiment is illustrative, and should not be construed as being limiting in any way.

The application server 102 can execute an operating system (not shown) and an application, service, function, module, script, or other executable code ("application") 106. The operating system can include a computer program that controls the operation of the application server 102 and the application 106 can be an executable program that executes on top of the operating system to provide functionality associated with the application server 102.

In some embodiments, the application server 102 can execute more than one application 106. Thus, the illustrated embodiment is merely illustrative of a simplified embodiment that should not be construed as being limiting in any way. The application 106 can provide various functions such as, for example, mail functionality, messaging functionality, social networking functionality, news and/or information application functionality, media functionality (e.g., hosted or streaming video, audio, and/or other media), authentication functionality, and/or any other application functionality. Thus, it can be appreciated that the application 106 can include almost infinite types and/or combinations of functionality. As such, the above examples should not be construed as being limiting in any way.

According to various embodiments of the concepts and technologies described herein, it may be desirable to establish a connection or other communication functionality between the application 106 and a resource operating on a distributed networking environment. As such, some embodiments of the concepts and technologies described herein can support creating such a connection, as will be described herein in more detail below.

According to various embodiments of the concepts and technologies described herein, the application server 102 can execute a connection management application 108. The connection management application 108 can be provided as a plug-in, add-on, module, or the like, for the application 106, in some embodiments. In some other embodiments, the connection management application 108 can be provided by a standalone application that is executed by the application server 102, as illustrated in FIG. 1. The connection management application 108 can be configured to communicate with other entities to request, receive, and use connection mechanisms that support communications between the application server 102 and a distributed networking environment, as will be detailed below.

Although the connection management application 108 is illustrated as a component of the application server 102, it should be understood that the connection management application 108 may be embodied as or in one or more standalone devices or components thereof operating as part of or in communication with the network 104 and/or the application server 102. As such, the illustrated embodiment should be understood as being illustrative of only some contemplated embodiments and should not be construed as being limiting in any way.

The connection management application 108 can be configured to communicate with a connection management service 110 (illustrated in FIG. 1 as being executed or hosted by a server computer 112) to obtain and use a connector 114. The connector 114 can be used by the application server 102 (or other requestor) to connect to a distributed networking environment such as a cloud computing environment, a virtual private network ("VPN"), an intranet, or the like ("distributed network") 116. The connection management application 108 can communicate with the connection management service 110 to request the connector 114, for example by way of a connection request ("request") 118. The connection management service 110 can identify the connector 114 and provide the connector 114 to the application server 102 as will be explained in more detail below.

The connection management service 110 can perform various operations to provide the functionality illustrated and described herein. In some embodiments, the connection management service 110 can authenticate or request authentication of the application server 102 before identifying and/or providing the connector 114. Thus, in some embodiments the connection management service 110 can include an authentication module and/or can interact with other entities to effect authentication of requestors.

In some embodiments, for example, the connection management service 110 can authenticate the application server 102 in response to the request 118. For example, the connection management service 110 can obtain credentials 120 from the application server 102 and authenticate the application server 102 by examining the credentials 120 using an authentication module or an authentication application. In some other embodiments, the connection management service 110 can obtain the credentials 120 and authenticate the application server 102 by forwarding the credentials 120 to an authentication service 122 or other entity. The connection management service 110 can receive a decision 124 from the authentication service 122 or other entity. The decision can indicate whether or not the application server 102 has been authenticated. In some embodiments in which the authentication is performed by the connection management service 110, the decision 124 can be generated by the connection management service 110 and therefore may not be communicated as shown in FIG. 1. Of course, it should be understood that a decision 124 may be omitted and other types of communications or indications may be used to indicate successful and unsuccessful authentication attempts. As such, the illustrated embodiment should be understood as being illustrative and should not be construed as being limiting in any way.

According to some embodiments of the concepts and technologies described herein, the request 118 and/or the credentials 120 can include a security token. In some embodiments of the concepts and technologies described herein, the request 118 can include a "subject" field or other data structure. The "subject" field can identify the requestor and/or provide the security token or other information used to identify and/or authenticate the requestor. According to various embodiments, the security token can correspond to a user name, a password, an IP address, a cookie, an oauth token, a digital certificate, a hash or other unique identifier such as a globally unique identifier ("GUID"), a device identifier, a generic token, and/or other types of information that can be used to identify and/or authenticate the application server 102 or other requestor of a connection to the distributed network 116. Because other types of information can be used to provide a security token, it should be understood that these examples are illustrative and therefore should not be construed as being limiting in any way.

In some embodiments, the authentication service 122 or an authentication module of the connection management service 110 can generate the security token. In some embodiments, the security token can be cached by the connection management service 110 for future use. The security token can be requested by the connection management service 110, in some embodiments, before the connection management service 110 will begin the operations of identifying and providing a connector 114 to a requestor.

If the application server 102 has been authenticated, or in cases in which authentication of the application server 102 is not undertaken for various reasons, the connection management service 110 can examine the request 118 and determine, based upon the request 118, what type of connection is requested by the application server 102. In some embodiments of the concepts and technologies described herein, the request 118 can include a "request information" field or other data structure. The "request information" field can specify the type of connection desired and/or any services that may be desired or needed to support the requested connection.

In some embodiments, for example, the "request information" can indicate that the connection will use and/or will support transmission control protocol ("TCP"), user datagram protocol ("UDP"), secure shell ("SSH"), hypertext transfer protocol ("HTTP") and/or HTTP over secure socket layer ("SSL")("HTTPS") protocol, encryption and/or decryption, digital signatures, other protocols and/or services, combinations thereof, or the like. The "request information" field therefore can describe what type of information will be exchanged between the requestor (the application server 102 in the illustrated embodiment of FIG. 1) and another entity such as, for example, a computer or application executing within the distributed network 116. Because the "request information" field can specify any parameters that may be used or needed to configure the requested connection, the above examples should be understood as being illustrative and therefore should not be construed as being limiting in any way.

By analyzing the request 118, the connection management service 110 can identify the subject, e.g., the requestor of the connection such as the application server 102, and the types of connections, protocols, and/or services that will be used to support communications over the connection. To identify the connector 114 that will be provided to the requestor, the connection management service 110 can access a database, repository, or other data structure ("connector repository") 126 that can store one or more connectors such as the connector 114 and/or one or more representations of the connectors. According to various embodiments, the connector repository 126 can be hosted by or stored on a data store 128 or other data storage device, though this is not necessarily the case. In some embodiments, the connector repository 126 can be stored by the server computer 112.

In the embodiment shown in FIG. 1, the connector repository 126 is illustrated as residing on the data store 128. The functionality of the data store 128 can be provided by one or more databases, server computers, desktop computers, mobile telephones, laptop computers, other computing systems, and the like. In the illustrated embodiments, the functionality of the data store 128 can be provided by a server computer such as the server computer 112. It should be understood that this example is illustrative and therefore should not be construed as being limiting in any way.

The connector repository 126 can include data that can identify and/or define one or more connectors such as the connector 114 and any number of other connectors 130A-N (hereinafter collectively and/or generically referred to as "other connectors 130"). According to various embodiments of the concepts and technologies described herein, the connector 114 and the other connectors 130 can be used by various entities to connect to the distributed network 116 in a consistent, controllable, predictable manner. In particular, the connector 114 and the other connectors 130 can provide a consistent and repeatable process for communicating with one or more resource 132 on a distributed networking environment such as the distributed network 116. Thus, the connector 114 and the connectors 130 can essentially be used as plugins to support communications between a requestor and a resource operating on or as part of the distributed network 116.

Thus, the connector 114 and the other connectors 130 can provide connections to the "cloud" or other distributed networking environments in a manner that emulates plugins. In particular, the connectors 114 can correspond to objects that can be passed or provided by the connection management service 110 to other entities. As used herein, the term "object" can be used to refer to an object in the object-oriented programming ("OOP") paradigm. As such, the term "object" can refer to information that can include data structures and/or executable code that can perform various functions via execution of methods and the use of attributes. The functions provided by these objects (the connector 114 and the other connectors 130) can correspond to establishing and/or controlling transport between the requestors and a resource on the distributed network 116. Because objects generally are understood, the code architecture of the connectors 114 and/or the other connectors 130 will not be further described herein.

The connector 114 and the other connectors 130 can be invoked by requestors such as the application server 102 to connect to the distributed network 116 at a single point and/or using protocols and services that can be defined for the connector 114 and the other connectors 130. Thus, if an application server 102 is provided the connector 114, the application server 102 can invoke the object corresponding to the connector 114 and thereby connect to the distributed network 116. The connector 114 and the other connectors 130 can implement the Java EE Connector architecture ("JCA") or a version or variant thereof such as J2EE Version 1.3, JCA Version 1.0, and/or J2EE Version 1.4, or other types of architectures, in some embodiments. As such, the connector 114 and/or the other connectors 130 can be managed by the application server 102 or other requestor that receives the connector 114 and the other connectors 130. It should be understood that this example is illustrative and therefore should not be construed as being limiting in any way.

In some embodiments, the connector 114 and the other connectors 130 can communicate with each other (or other objects) to provide a distributed architecture, though this is not necessarily the case. Regardless of whether or not the connector 114 and the other connectors 130 interact with one another, the connector 114 and the other connectors 130 can reside on and/or provide functionality associated with a distributed network interface 134 that can be a virtual portal via which requestors connect to the distributed network 116 via the connector 114 and/or the other connectors 130. It should be understood that this example is illustrative and therefore should not be construed as being limiting in any way.

It should be understood that the connector 114 and the other connectors 130 can be similar to one another but are numbered differently in FIG. 1 for the purpose of simplifying illustration and description of these and other elements of the operating environment illustrated in FIG. 1. Thus, as used herein, the phrase "other connectors 130" can be used to refer to connectors that are not used by the requestor (e.g., the application server 102) to connect to the distributed network 116 and the phrase "connector 114" can be used to refer to a connector that is used by the requestor (e.g., the application server 102) to connect to the distributed network 116. This numbering and naming is used solely for convenience of illustrating and describing the concepts and technologies described herein and therefore should not be construed as being limiting in any way the scope of the disclosure made herein.

After identifying the connector 114, the connection management service 110 can determine if the connector 114 is active or if the connector 114 is not active. In some embodiments, the connector 114 can be a persistent connection, while in some other embodiments, the connector 114 may not persist after communications for which the connection is requested are terminated. Thus, the connection management service 110 can determine if the connector 114 is available or if the connection management service 110 should instantiate and/or configure the connector 114. If the connection management service 110 determines that the connector 114 is not active, the connection management service 110 can instantiate the connector 114 on the distributed network interface 134 and configure the connector 114.

When configuring the connector 114, the connection management service 110 can determine and set one or more connection parameters that may be needed to connect to the distributed network 116 and/or a resource 132 thereon. Illustrative connection parameters can include, but are not limited to, an indication as to whether or not the connector 114 should be persistent, any timeouts that are to be set for the connector 114, numbers of retries allowed for connection requests and/or attempts to transfer communications via the connector 114, and the like. The connector 114 can be configured, via the connection parameters and/or other considerations such as the "request information" and/or "subject" fields of the request, as simple object access protocol ("SOAP") based web services, representational state transfer ("REST") based web application programming interfaces ("APIs") or objects (also known as RESTful interfaces), a Java Database Connectivity ("JDBC") API or other interface, a general socket connection, other types of interfaces or connections, combinations thereof, or the like. Because other types of connections are possible and are contemplated, it should be understood that these examples are illustrative and therefore should not be construed as being limiting in any way.

It can be appreciated that the above examples of connections and some other connections may require additional information and/or setup and as such, the security token or credentials 120 or the request 118 may include the other information needed to support the connection. For example, a SOAP-based connection may require set-up of endpoints via a web service definition language ("WSDL") file or other type of extensible markup language ("XML") file. As such, this WSDL or XML file may be provided as part of the request 118 and/or the credentials 120 as illustrated and described herein.

Similarly, a RESTful connection may require knowledge of an endpoint of the RESTful API server, which also can be provided as part of the request 118 and/or the credentials 120 as illustrated and described herein. Similarly, a JDBC connection may require knowledge of the connection string, which also can be provided as part of the request 118 and/or the credentials 120 as illustrated and described herein. Still further, a general connection may require knowledge of the server hostname, IP address, port, combinations thereof, or the like, which also can be provided as part of the request 118 and/or the credentials 120 as illustrated and described herein. Thus, it can be appreciated that various types of information used to configure and/or support the connector 114 can also be provided as part of the credentials 120 and/or the request 118, though this is not necessarily the case.

Once the connector 114 is active, the connection management service 110 can provide the connector 114 to the requestor (e.g., the application server 102). As noted above, the object that corresponds to the connector 114 can be provided to the requestor and the requestor can invoke the object to connect to the distributed network 116. It should be understood that this example is illustrative and therefore should not be construed as being limiting in any way.

In FIG. 1, the connector 114 is illustrated as being instantiated and configured via instructions and/or other communications as shown by the line labeled 136 in FIG. 1. Upon instantiation and/or configuration, the connector 114 can encapsulate and manage a connection between a requestor (e.g., the application server 102) and a resource 132 on the distributed network 116. As such, the application server 102 can connect to the distributed network 116 (or more particularly to a resource 132 therein or thereon) by invoking the connector 114 as shown by reference numeral 138, and then connect to the distributed network 116 (or a resource 132 thereon) using communications via the connector 114 as shown by the lines 140. As such, it should be understood that the connection parameters and/or the "request information" field can include identification of a particular resource 132 to which the requestor is to connect, though this is not necessarily the case. It should be understood that this example is illustrative and therefore should not be construed as being limiting in any way.

In practice, a requestor such as the application server 102 can interact with the connection management service 110 to request a connection to a distributed networking environment such as the distributed network 116. The requestor can request the connection by generating a connection request such as the request 118. The request 118 can include a "subject" field or other data structure that can identify the requestor and a "request information" field or other data structure that can set forth various aspects of the requested connection such as protocols to be supported, security or other services to be layered on the connection, types of information to be transferred via the connection, a resource 132 to which the requestor is to connect, combinations thereof, or the like.

The connection management service 110 can analyze the request 118 to identify the requestor and the type of connection requested. In some embodiments, the connection management service 110 can authenticate the requestor. The requestor can be authenticated in various manners. In some embodiments, the requestor can provide a security token or other information as credentials 120 that can be used to authenticate the requestor. The connection management service 110 can perform authentication on its own or pass the credentials 120 to an authentication service 122 and receive a decision 124 indicating whether authentication was successful or not. Upon authenticating the requestor or determining that authentication is not needed, the connection management service 110 can identify a connector 114 to support the requested connection.

Upon identifying the connector 114, the connection management service 110 can determine if the identified connector 114 is active or if the connector 114 is not active. If the connector 114 is not active, the connection management service 110 can instantiate and configure the connector 114. The instantiated and configured connector 114 can be provided to the requestor by the connection management service 110 and the requestor can then invoke the connector 114 to connect to the distributed network 116 or a resource 132 thereon. Additional details of identifying, providing, and using the connector 114 will be illustrated and described in additional detail below with reference to FIGS. 2-4.

FIG. 1 illustrates one application server 102, one network 104, one server computer 112, one connector 114, one distributed network 116, one authentication service 122, four other connectors 130, and one distributed network interface 134. It should be understood, however, that various implementations of the operating environment 100 can include zero, one, or more than one application server 102; zero, one, or more than one network 104; zero, one, or more than one server computer 112; zero, one, or more than one connector 114; zero, one, or more than one authentication service 122; zero, one, two, three, four, or more than four other connectors 130; and/or zero, one, or more than one distributed network interface 134. As such, the illustrated embodiment should be understood as being illustrative, and should not be construed as being limiting in any way.

Figure 2:
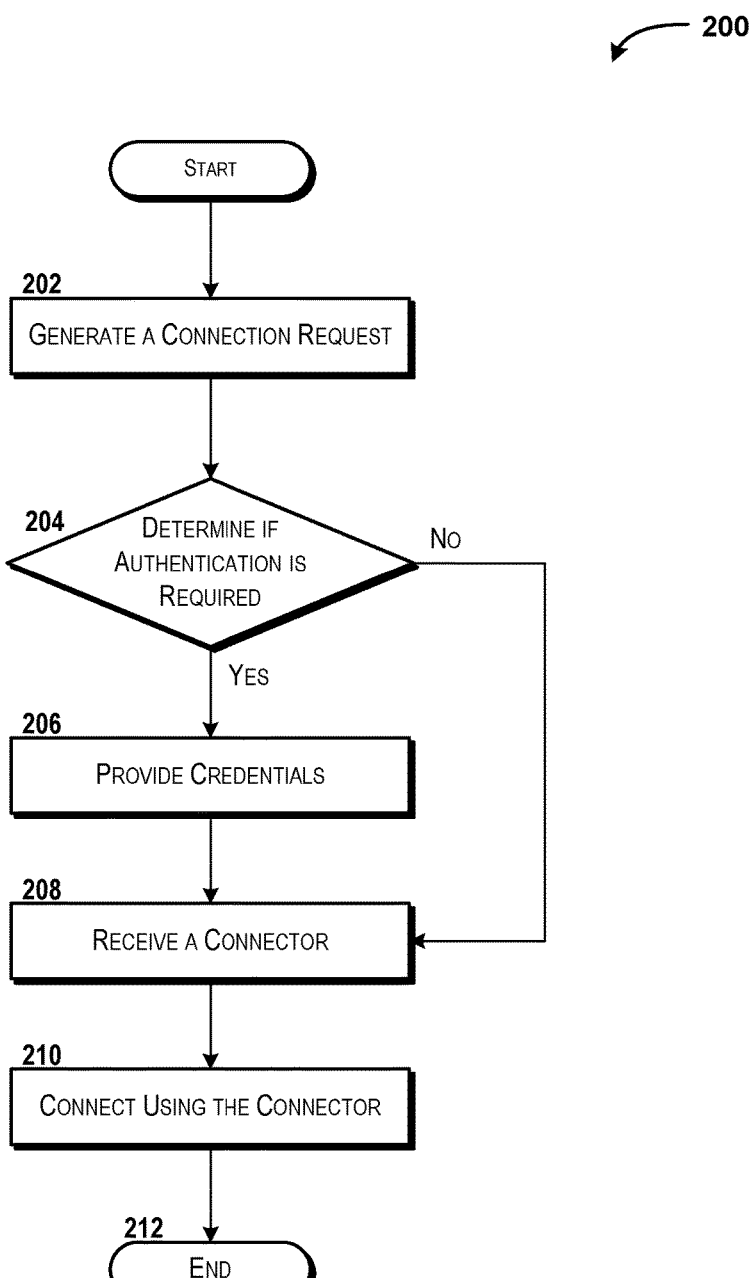
FIG. 2 is a flow diagram showing aspects of a method for requesting a connector from a connection management service, according to an illustrative embodiment of the concepts and technologies described herein.

Turning now to FIG. 2, aspects of a method 200 for requesting a connector 114 from a connection management service 110 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the application server 102 and/or the server computer 112, to perform one or more operations and/or causing the processor to direct other components of the computing system or device to perform one or more of the operations.

For purposes of illustrating and describing the concepts of the present disclosure, the method 200 disclosed herein is described as being performed by the application server 102 via execution of one or more software modules such as, for example, the connection management application 108. It should be understood that additional and/or alternative devices and/or network nodes can provide the functionality described herein via execution of one or more modules, applications, and/or other software including, but not limited to, the connection management application 108. Thus, the illustrated embodiments are illustrative, and should not be viewed as being limiting in any way.

The method 200 begins at operation 202. At operation 202, the application server 102 can generate a connection request. In some embodiments, the connection request generated in operation 202 can correspond to the request 118 shown in FIG. 1, though this is not necessarily the case. The connection request generated in operation 202 can correspond to a request, by the application server 102 or other requestor, to connect to a distributed networking environment such as the distributed network 116 shown in FIG. 1. The connection request can include identifying information for the requestor, an indication of what types of communications are requested, a bandwidth desired or required, a latency requested or required, services to be provided for the connection, protocols to be supported, other information, combinations thereof, or the like.

In some embodiments, the connection request merely requests a connection with the distributed network 116 and can be evaluated by the connection management service 110 or other service or entity to determine types of communications to occur via the connection, a desired or optimal bandwidth, a desired or optimal latency, a desired or optimal protocol to be used for the communications, supported languages or protocols, combinations thereof, or the like. In some other embodiments, the connection request can correspond to the request 118 illustrated and described above with reference to FIG. 1 and therefore can include a "subject" field that can identify the requestor and a "request information" field that can identify various aspects of the connection that is being requested by way of the connection request. Because additional and/or alternative information can be included in the connection request and/or determined based upon the connection request, it should be understood that these examples are illustrative and therefore should not be construed as being limiting in any way.

From operation 202, the method 200 proceeds to operation 204. At operation 204, the application server 102 can determine if authentication is required. In operation 204, the application server 102 can determine if the connection management service 110 has requested that the application server 102 authenticate with the connection management service 110. In some embodiments, the connection management service 110 may not require authentication, while in some other embodiments, authentication may be required before a requestor is allowed to connect to the distributed network 116.

Authentication may be required, for example, based upon the resource 132 associated with the requested connection (e.g., the resource 132 may host private or sensitive data and authentication therefore may be required); based upon the types of information that are to be exchanged over the connection (e.g., the information may be private or sensitive); users or requestors associated with the requested connection; combinations thereof; or the like. Although the decision as to whether or not the authentication is required may be performed by the connection management service 110, the application server 102 may determine if such authentication is required by receiving (or not receiving) an indication that the credentials 120 are required. Because the application server 102 can make the determination illustrated in operation 204 in additional and/or alternative manners, it should be understood that this example is illustrative and therefore should not be construed as being limiting in any way.

If the application server 102 determines, in operation 204, that authentication is required, the method 200 can proceed to operation 206. In operation 206, the application server 102 can provide the credentials 120 to the connection management service 110. In some embodiments, the application server 102 can maintain multiple credentials and as such, the application server 102 can identify the credentials 120 from a number of credentials although this operation is not illustrated in FIG. 2. From operation 206, the method 200 can proceed to operation 208. The method 200 also can proceed to operation 208 from operation 204 if the application server 102 determines, in operation 204, that authentication is not required.

Although the method 200 is illustrated in FIG. 2 as including operation 204, it should be understood that this operation can be omitted in various embodiments, even if authentication is required. In particular, in some embodiments the credentials 120 or other information can be included with or as a part of the connection request generated in operation 202. As such, from the perspective of the application server 102, the method 200 may proceed from operation 202 to 208 as illustrated and described hereinbelow as the credentials 120 or equivalent information (e.g., the "subject" field in the request 118) may already have been provided. A such, the illustrated embodiment should be understood as illustrative of one embodiment and should not be construed as being limiting in any way.

At operation 208, the application server 102 can receive a connector 114. As explained above in detail with reference to FIG. 1, the connector 114 can include or correspond to an object. As such, the application server 102 can receive an object in operation 208 or the application server 102 can receive an object reference via which the application server 102 can identify and/or obtain the object. Thus, for example, the application server 102 can store multiple objects and the information received by the application server 102 in operation 208 can be used by the application server 102 to identify the object that will provide the functionality of the connector 114. Because the functionality of the connector 114 can be provided by additional and/or alternative types of computer executable code and/or data structures instead of or in addition to an object, it should be understood that this example is illustrative and therefore should not be construed as being limiting in any way.

From operation 208, the method 200 proceeds to operation 210. At operation 210, the application server 102 can connect to the distributed network 116 using the connector 114 received in operation 208. As explained above in detail with reference to FIG. 1, the application server 102 can invoke an object corresponding to the connector 114. Because the connector 114 can encapsulate and manage a connection to the distributed network 116, the application server 102 can connect to the distributed network 116 by invoking the object that corresponds to the connector 114. It should be understood that this example is illustrative and therefore should not be construed as being limiting in any way.

Similarly, because the object that corresponds to the connector 114 can specify protocols, services, and the like, the application server 102 can connect to the distributed network 116 in a unified and consistent manner relative to other entities that invoke the same object (connector 114). As such, the connector 114 can provide the application server 102 with connectivity to the distributed network 116 in a pluggable manner so that connections to the distributed network can be consistent and controlled across all requestors that invoke that particular connector 114. It should be understood that this example is illustrative and therefore should not be construed as being limiting in any way.

It therefore can be appreciated that embodiments of the concepts and technologies described herein can provide consistent and unified single-point connections between requestors and the distributed network 116 and/or one or more resource 132 operating on or as a part of the distributed network 116. Thus, instead of requestors such as the application server 102 being required to connect to the distributed network 116 in an ad hoc fashion, the connector 114 can provide a pluggable repeatable and replicable connection mechanism that can function in a consistent, controllable, and safe manner for any requestor that invokes that connector 114.

The connector 114 also can specify security and services for the connection regardless of the requestor, and as such security and/or other services can be controlled by authors of the connector 114. Thus, the requestor may not need to tailor any connections to the distributed network 116 and instead can rely on proven, trusted, controllable, and safe connections provided by the connector 114. Because these and other advantages illustrated and described herein may or may not be present in all embodiments of the concepts and technologies described herein, it should be understood that these example advantages are illustrative and therefore should not be construed as being limiting in any way.

From operation 210, the method 200 proceeds to operation 212. The method 200 ends at operation 212.

Figure 3:
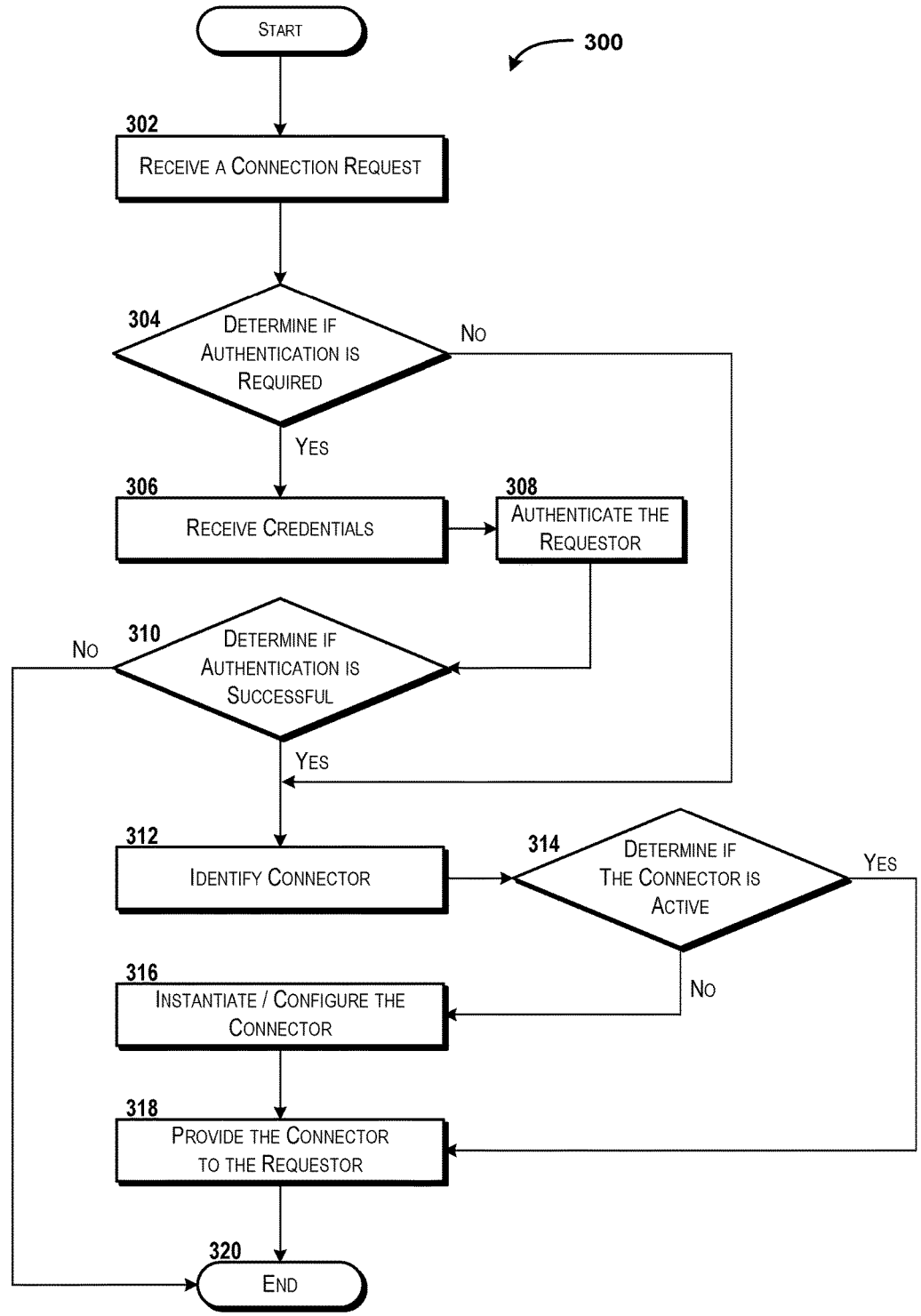
FIG. 3 is a flow diagram showing aspects of a method for providing a connector by a connection management service, according to an illustrative embodiment of the concepts and technologies described herein.

Turning now to FIG. 3, aspects of a method 300 for providing a connector 114 by a connection management service 110 will be described in detail, according to an illustrative embodiment. For purposes of illustrating and describing the concepts of the present disclosure, the methods disclosed herein are described as being performed by the server computer 112 via execution of one or more software modules such as, for example, the connection management service 110. It should be understood that additional and/or alternative devices and/or network nodes can provide the functionality described herein via execution of one or more modules, applications, and/or other software including, but not limited to, the connection management service 110. Thus, the illustrated embodiments are illustrative, and should not be viewed as being limiting in any way.

The method 300 begins at operation 302. At operation 302, the server computer 112 can receive a connection request such as the request 118. As explained above, the connection request can include a request for a connection and other information. In some embodiments, the connection request received in operation 302 can include a "subject" field or other data structure and/or a "request information" field or other data structure. The connection request also can include, in some embodiments, the credentials 120, which can be provided with, as, or by the "subject" field or other data structure.

As explained above, the "subject" field can identify the requestor, in some embodiments. Thus, the "subject" field can include or represent a username, a password, an IP address, a GUID, a token, a digital certificate, a name, an account, other identifying information, combinations thereof, or the like. The "request information" field can identify a type of communications that are to take place over the connection requested by the connection request, services to be provided with the connection, protocols and/or security to be provided by the connection, other information, combinations thereof, or the like. Thus, the "request information" field can include an identification of protocols, security services, other services, combinations thereof, or the like. This information can be used by the server computer 112 to configure the connector 114 and/or to identify the connector 114, as will be illustrated and described herein in more detail below.

From operation 302, the method 300 proceeds to operation 304. At operation 304, the server computer 112 can determine if authentication is required. In particular, the server computer 112 can determine, prior to identifying and/or providing the connector 114, if authentication is required for the requestor that generated (or is associated with) the connection request received in operation 302. In some instances, the server computer 112 may determine that a particular connection requested by the requestor can only be shared with authorized entities. For example, if the resource 132 to which connection is requested corresponds to an account information database, the server computer 112 may determine that only authorized entities can receive the connector 114 as the account information database may contain private information.

In another example, a protected connection or port to an intranet or private network may only be shared with entities entitled to connect to the network (e.g., employees, or the like). In some other instances, a connection may be requested to obtain publicly available information via an API or other connection (e.g., a map or navigation service API, or the like) and therefore may not require authentication. Because the server computer 112 may determine that a requestor should be authenticated or should not be authenticated for almost any reason, it should be understood that these examples are illustrative and therefore should not be construed as being limiting in any way.

If the server computer 112 determines, in operation 304, that authentication is required, the method 300 can proceed to operation 306. In operation 306, the server computer 112 can receive credentials such as the credentials 120 from the requestor (e.g., the application server 102). Although not shown in FIG. 3, it should be understood that the server computer 112 can request the credentials 120 from the requestor prior to receiving the credentials 120 in operation 306. In particular, as explained above, the credentials 120 can be provided with or as part of the connection request received in operation 302 and therefore may not be requested in operation 308. Rather, the server computer 112 can extract the credentials 120 in operation 308 (or at other times) from other information such as the connection request, if desired. From operation 306, the method 300 proceeds to operation 308.

At operation 308, the server computer 112 can authenticate the requestor (e.g., the application server 102). In some embodiments, the server computer 112 can be configured to authenticate the requestor and in some other embodiments, the server computer 112 can invoke or call other entities, applications, or services to authenticate the requestor. In the embodiment illustrated in FIG. 1, the server computer 112 can forward the credentials received in operation 306 to an authentication service 122, which can then provide an authentication decision (e.g., the decision 124) to the server computer 112. The server computer 112 can determine, based upon the decision 124, if the requestor has been authenticated. It should be understood that this example is illustrative and therefore should not be construed as being limiting in any way.

If the server computer 112 determines, in operation 310, that the authentication is successful, the method 300 can proceed to operation 312. The method 300 also can proceed to operation 312 if the server computer 112 determines, in operation 304, that authentication is not required. In operation 312, the server computer 112 can identify a connector 114. According to various embodiments, the server computer 112 can examine the connector repository 126 and identify, based upon the contents, a connection mechanism that will provide the requested connection.

Thus, it should be appreciated that the server computer 112 can determine, based upon the "request information" field, what protocols and/or services are to be provided by the connection requested by way of the connection request and identify, among a number of connection mechanisms in the connector repository 126, a connector 114 that meets the requirements and/or desires of the requestor with respect to the requested connection. Because the connector 114 can be identified in additional and/or alternative manners, it should be understood that this example is illustrative and therefore should not be construed as being limiting in any way.

From operation 312, the method 300 proceeds to operation 314. At operation 314, the server computer 112 can determine if the connector 114 identified in operation 312 is active or if the connector 114 identified in operation 312 is not active. In some embodiments of operation 314, the server computer 112 can determine if the connector 114 is active on the distributed network interface 134 or if the connector 114 is not active on the distributed network interface 134. If the server computer 112 determines, in operation 314, that the connector 114 is not active, the method 300 can proceed to operation 316.

In operation 316, the server computer 112 can instantiate and configure the connector 114 identified in operation 312. In some embodiments, the connector 114 may not persist after a connection provided via the connector 114 terminates. As such, the server computer 112 can be configured to instantiate the connector 114 prior to providing the connector 114 (or an identifier corresponding to the connector 114) to a requestor. The server computer 112 can activate the connector and configure, via application of one or more connection parameters, the connector 114. As explained above, the configuration of the connector 114 can include specifying endpoints, specifying protocols, specifying addresses, and/or specifying other information that will be used by the connector 114 to provide the requested connection. It should be understood that this example is illustrative and therefore should not be construed as being limiting in any way.

From operation 316, the method 300 proceeds to operation 318. The method 300 also can proceed to operation 318 if the server computer 112 determines, in operation 314, that the connector 114 identified in operation 312 is active. In operation 318, the server computer 112 can provide the connector 114 to the requestor (e.g., the application server 102). As explained herein, the server computer 112 can provide an object corresponding to the connector 114 to the requestor or provide information that identifies the connector 114 to the requestor. As such, the requestor can be configured to invoke the connector 114 and thereby to connect to a resource 132 on the distributed network 116. It should be understood that this example is illustrative and therefore should not be construed as being limiting in any way.

According to various embodiments of the concepts and technologies described herein, the connector 114 and the other connectors 130 can be provided by one or more components. The components can be self-contained functional software units. Each of the software units can represent a portion of application logic divided by function. According to various embodiments, the portion of the application logic can be an implementation of the model-view-controller ("MVC"), though this is not necessarily the case. The connector 114 and the other connectors 130 can implement a well-defined API that can enable bidirectional communication between a requestor such as the application server 102 and a resource 132 on the distributed network 116, an enterprise system, an intranet, or the like.

The connector 114 and the other connectors 130 also can manage connections to the distributed network 116. Such management can enable an efficient use of physical connections as well as provide additional services needed to support, for example, security, database management, advanced protocols, encryption, signatures, SSL, certificate management, logging, filtering, other web services, or the like. The connector 114 and the other connectors 130 also can control or manage physical connections that can include various facets of connections such as TCP, HTTP/HTTPS, SSH, and the like. The connector 114 and the other connectors also can implement higher forms of communication such as a web service and a database connection (such as ODBC). The connector 114 and the other connectors 130 can communicate with one another to allow for distributed software computing and the sharing of resources, in some embodiments.

From operation 318, the method 300 proceeds to operation 320. The method 300 also can proceed to operation 320 if the server computer 112 determines, in operation 310, that authentication is not successful. The method 300 ends at operation 320.

Figure 4:
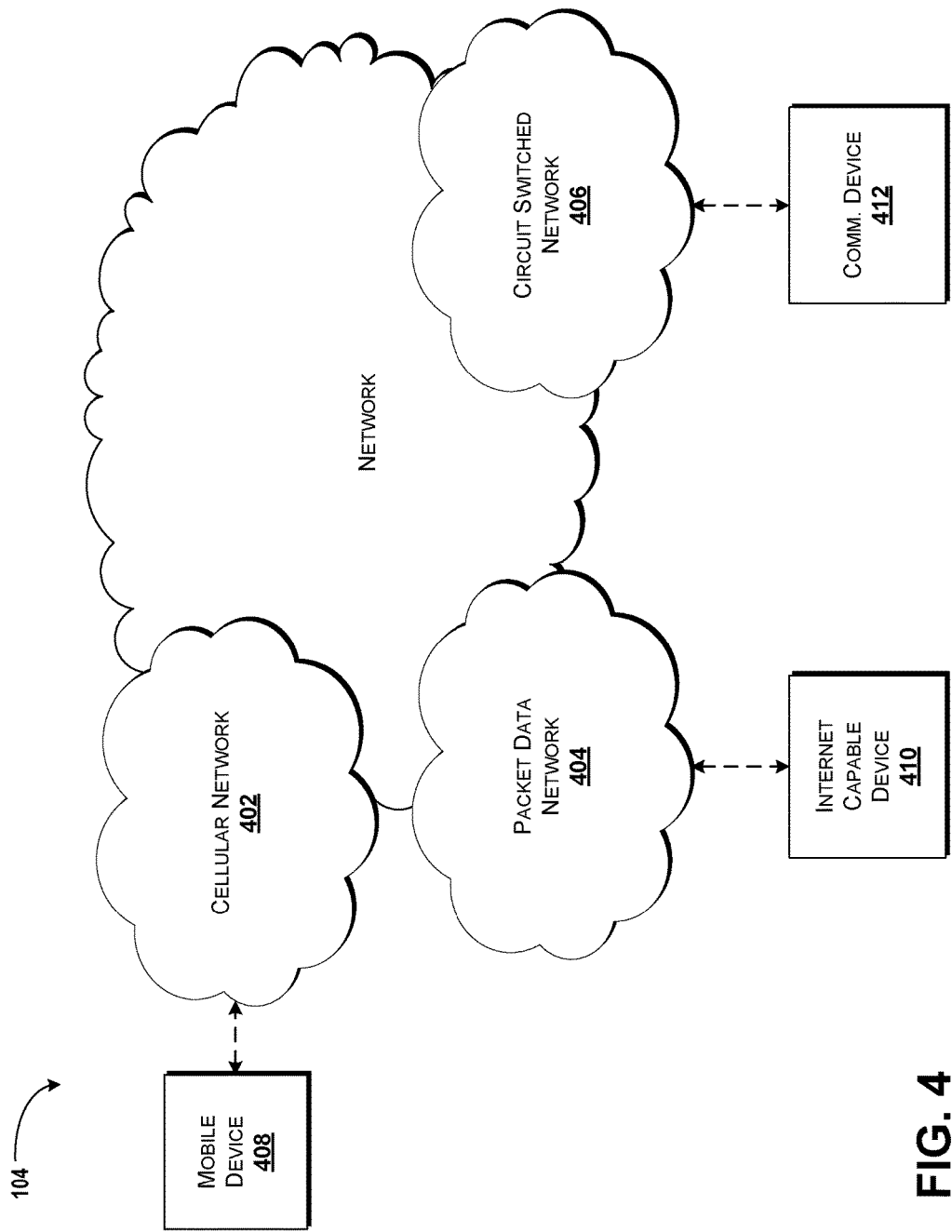
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
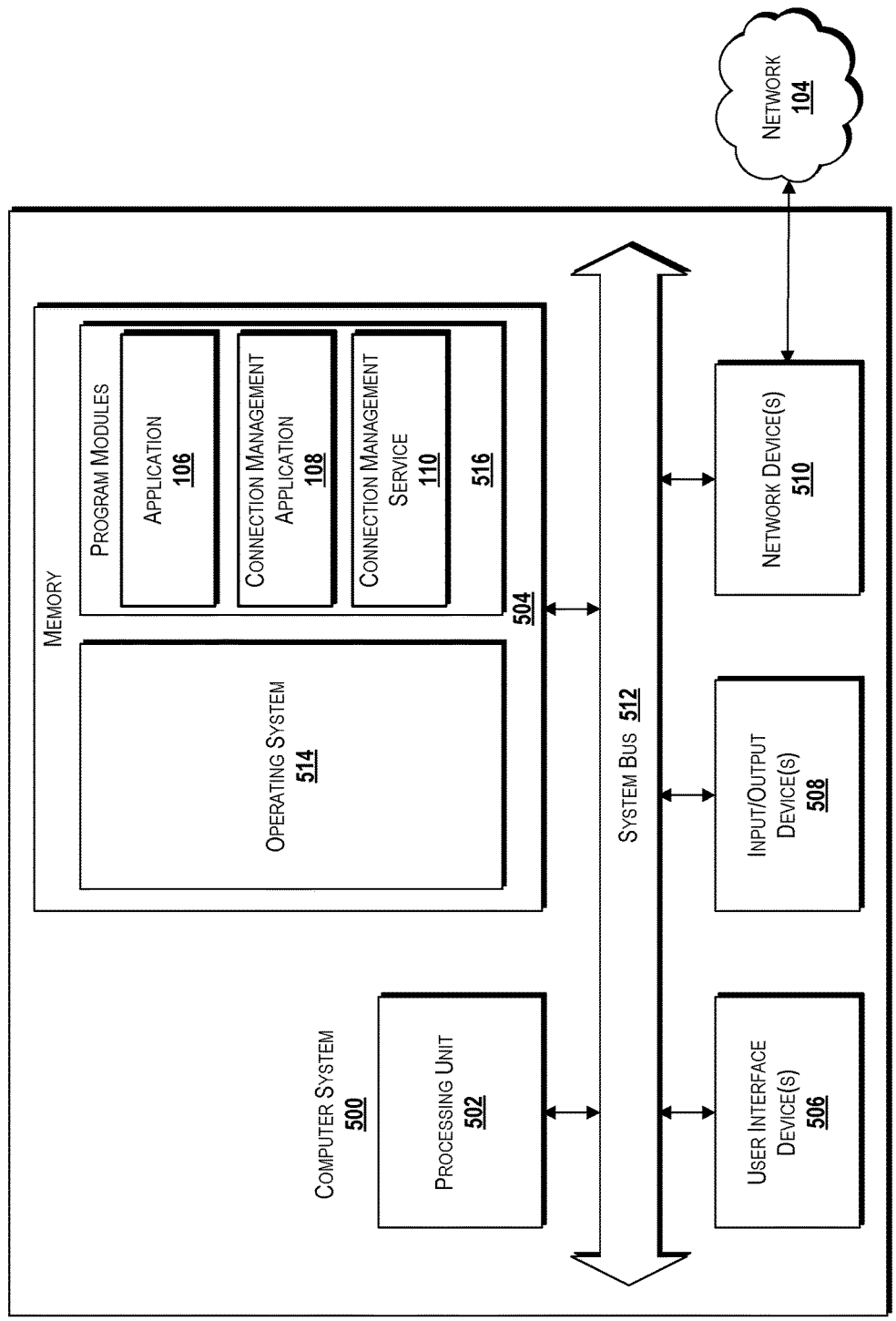
FIG. 5 is a block diagram illustrating an example computer system configured to connection management service, according to some illustrative embodiments of the concepts and technologies described herein.

FIG. 5 is a block diagram illustrating a computer system 500 configured to provide the functionality described herein for providing and using a connection management service, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 can include the application 106, the connection management application 108, and/or the connection management service 110. These and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the connector 114, the request 118, the credentials 120, the decision 124, the connector repository 126, the other connectors 130, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing and using a connection management service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, at a computer comprising a processor, a connection request that requests a connector that is used to provide a connection between a requestor that generated the connection request and a resource that operates on a distributed network;
   transmitting, by the computer and directed to an authentication service, credentials associated with the requestor;
   determining, by the computer, that the requestor is authorized to connect to the resource;
   identifying, by the computer, the connector; and
   transmitting, by the computer and directed to the requestor, an object that corresponds to the connector, wherein the requestor uses the object to connect to the distributed network.

2. The method of claim 1, wherein identifying the connector comprises searching a connector repository to identify the connector based on an identity of a service that is to be supported by the connection.

3. The method of claim 1, further comprising:
   extracting, by the computer, the credentials from the connection request, wherein the credentials comprise data included in a subject field of the connection request.

4. The method of claim 1, wherein the requestor comprises an application server.

5. The method of claim 4, wherein the connection request comprises a subject field and a request information field, wherein the subject field identifies the application server, and wherein the request information field identifies a service that is supported by the connection.

6. The method of claim 1, further comprising:
   determining that the connector is not active;
   initiating instantiation of the connector; and
   configuring the connector.

7. The method of claim 6, wherein configuring the connector comprises:
   identifying a connection parameter associated with the connector; and configuring the connector based on the connection parameter.

8. A system comprising:
a processor; and
a memory that stores computer-executable instructions that, when executed by the processor, cause the processor to perform operations comprising
receiving a connection request that requests a connector that is used to provide a connection between a requestor that generated the connection request and a resource that operates on a distributed network,
transmitting, directed to an authentication service, credentials associated with the requestor,
determining that the requestor is authorized to connect to the resource,
identifying the connector, and
transmitting, directed to the requestor, an object that corresponds to the connector, wherein the requestor uses the object to connect to the distributed network.

9. The system of claim 8, wherein the computer-executable instructions, when executed by the processor, cause the processor to perform operations further comprising:
extracting credentials from the connection request, wherein the credentials comprise data included in a subject field of the connection request.

10. The system of claim 8, wherein the computer-executable instructions, when executed by the processor, cause the processor to perform operations further comprising:
determining that the connector is not active;
initiating instantiation of the connector; and
configuring the connector, wherein configuring the connector comprises
identifying a connection parameter associated with the connector, and
configuring the connector based on the connection parameter.

11. The system of claim 8, wherein the requestor comprises an application server.

12. The system of claim 11, wherein the connection request comprises a subject field and a request information field, wherein the subject field identifies the application server, and wherein the request information field identifies a service that is supported by the connection.

13. The system of claim 8, wherein identifying the connector comprises searching a connector repository to identify the connector based on an identity of a service that is to be supported by the connection.

14. A computer storage medium having computer-executable instructions stored thereon that, when executed by a processor, cause the processor to perform operations comprising:
receiving a connection request that requests a connector that is used to provide a connection between a requestor that generated the connection request and a resource that operates on a distributed network;
transmitting, directed to an authentication service, credentials associated with the requestor;
determining that the requestor is authorized to connect to the resource;
identifying the connector; and
transmitting, directed to the requestor, an object that corresponds to the connector, wherein the requestor uses the object to connect to the distributed network.

15. The computer storage medium of claim 14, wherein the computer-executable instructions, when executed by the processor, cause the processor to perform operations further comprising:
extracting credentials from the connection request, wherein the credentials comprise data included in a subject field of the connection request.

16. The computer storage medium of claim 14, wherein the computer-executable instructions, when executed by the processor, cause the processor to perform operations further comprising:
determining that the connector is not active;
initiating instantiation of the connector; and
configuring the connector, wherein configuring the connector comprises
identifying a connection parameter associated with the connector, and
configuring the connector based on the connection parameter.

17. The computer storage medium of claim 14, wherein the requestor comprises an application server.

18. The computer storage medium of claim 14, wherein the requestor comprises an application server.

19. The computer storage medium of claim 18, wherein the connection request comprises a subject field and a request information field, wherein the subject field identifies the application server, and wherein the request information field identifies a service that is supported by the connection.

20. The computer storage medium of claim 14, wherein identifying the connector comprises searching a connector repository to identify the connector based on an identity of a service that is to be supported by the connection.

* * * * *